(12) United States Patent
Nguyen et al.

(10) Patent No.: US 6,832,650 B2
(45) Date of Patent: *Dec. 21, 2004

(54) METHODS OF REDUCING OR PREVENTING PARTICULATE FLOW-BACK IN WELLS

(75) Inventors: Philip D. Nguyen, Duncan, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/241,987

(22) Filed: Sep. 11, 2002

(65) Prior Publication Data

US 2004/0206499 A1 Oct. 21, 2004

(51) Int. Cl.⁷ .............................................. E21B 43/02
(52) U.S. Cl. .................. 166/279; 166/280.1; 166/308.6
(58) Field of Search ................................ 166/280, 281, 166/283, 276, 279, 308, 280.1, 308.1, 308.6; 507/922, 924

(56) References Cited

U.S. PATENT DOCUMENTS

| | | | |
|---|---|---|---|
| 4,119,150 A | 10/1978 | Froelich | 166/276 |
| 5,105,884 A * | 4/1992 | Sydansk | 166/270 |
| 5,330,005 A | 7/1994 | Card et al. | 166/280 |
| 5,439,055 A | 8/1995 | Card et al. | 166/280 |
| 5,501,274 A | 3/1996 | Nguyen et al. | 166/276 |
| 5,501,275 A | 3/1996 | Card et al. | 166/280 |
| 5,582,249 A | 12/1996 | Caveny et al. | 166/276 |
| 5,697,440 A | 12/1997 | Weaver et al. | 166/281 |
| 5,775,425 A | 7/1998 | Weaver et al. | 166/276 |
| 5,787,986 A | 8/1998 | Weaver et al. | 166/280 |
| 5,833,000 A | 11/1998 | Weaver et al. | 166/276 |
| 5,839,510 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,924,488 A | 7/1999 | Nguyen et al. | 166/280 |
| 6,330,916 B1 | 12/2001 | Rickards et al. | 166/280 |
| 6,439,309 B1 | 8/2002 | Matherly et al. | 166/276 |

FOREIGN PATENT DOCUMENTS

| | | | | |
|---|---|---|---|---|
| EP | 0735235 A1 | 10/1996 | | |
| EP | 0879935 A2 | 11/1998 | ........... | E21B/43/26 |
| EP | 1126131 A1 | 8/2001 | ........... | E21B/43/26 |
| GB | 2115040 A | 9/1983 | ........... | E21B/43/08 |

* cited by examiner

Primary Examiner—Zakiya Walker
(74) Attorney, Agent, or Firm—Robert A. Kent; C. Clark Dougherty, Jr.

(57) ABSTRACT

Methods of reducing or preventing particulate flow-back in subterranean zones. In accordance with the methods, a treating fluid having a mixture of reticulated foam fragments and particulate solids are suspended therein. The treating fluid is introduced into a subterranean zone and the mixture of the reticulated foam fragments and the particulate solids are deposited in the subterranean zone whereby the reticulated foam fragments retard or prevent the flow-back of the particulate solids and the transport of formation fines from the subterranean zone upon the flowing-back of fluid from the zone.

28 Claims, 1 Drawing Sheet

METHODS OF REDUCING OR PREVENTING PARTICULATE FLOW-BACK IN WELLS

BACKGROUND OF THE INVENTION

1. Field of the Invention

This invention provides methods of treating subterranean zones wherein particulate solids are placed in the zones to prevent the transport of formation fines therefrom.

2. Description of the Prior Art

The transport of formation fines, e.g., sand and the like, from subterranean zones or formations with produced fluids is very detrimental in that the formation fines erode metal goods, plug piping and vessels and cause damage to valves, instruments and other production equipment. Such formation fines are generally available for transport from unconsolidated subterranean zones or formations.

In order to prevent the transport of formation fines from subterranean producing zones, particulate solids have been placed in the well bores or formations penetrated thereby such as by gravel packing or propped fracturing. In gravel packing treatments, particulate solids such as graded sand (referred to in the art as gravel) is suspended in a treating fluid and carried to a subterranean zone in which a gravel pack is to be placed. Once the gravel is placed in the zone, the treating fluid is recovered or allowed to dissipate into subterranean formations penetrated by the well bore. The gravel pack functions as a filter to separate formation fines from produced formation fluids while permitting the produced fluids to flow into and through the well bore. In fracturing treatments, a treating fluid is pumped through a well bore into a subterranean zone to be stimulated at a rate and pressure such that fractures are formed and extended in the subterranean zone. Particulate solids (referred to in the art as proppant particles) such as graded sand are carried into the fractures by the treating fluid. The proppant particles are deposited in the fractures and the treating fluid is recovered. The proppant particles function to prevent the formed fractures from closing whereby conductive channels are formed through which produced fluids can flow to the well bore.

While gravel packs and propped fractures have been used successfully to reduce or prevent the transport of formation fines, a problem very often encountered is the flow-back of gravel or proppant particles which leads to the transport of formation fines with hydrocarbon and other fluids produced from the subterranean zone. Like formation fines, the flow-back of gravel or proppant particles from gravel packs or propped fractures with or without formation fines erodes metal goods, plugs, piping and vessels and causes damage to valves, instruments and other production equipment.

A number of techniques have heretofore been developed to prevent gravel and proppant particle flow-back which include coating the gravel or proppant particles with a hardenable resin or a tackifying agent that consolidates the gravel or proppant particles into hard permeable masses. In addition, fibers, thermoplastic particulate, ribbons, flakes and other similar materials have been mixed with the gravel or proppant particles to prevent gravel or proppant flow-back. While the techniques utilized heretofore have been successful in limiting gravel or proppant particle flow-back, gravel or proppant particle flow-back still occurs. Thus, there is a continuing need for improved methods of treating subterranean zones penetrated by well bores whereby gravel or proppant particle flow-back and/or the transport of formation fines from the subterranean zones are prevented.

SUMMARY OF THE INVENTION

The present invention provides improved methods of treating subterranean zones whereby particulate solid flow-back and the transport of formation fines from subterranean zones is reduced or prevented. The methods of the present invention are basically comprised of the following steps. A treating fluid having a mixture of reticulated foam fragments and particulate solids suspended therein is provided. The reticulated foam fragments are present in the treating fluid in an amount in the range of from about 0.1% to about 5% by weight of the particulate solids therein. The treating fluid is introduced into the subterranean zone and the mixture of the reticulated foam fragments and the particulate solids are deposited in the subterranean zone. The presence of the reticulated foam fragments in the mixture of the fragments with particulate solids reduce or prevent the flow-back of the particulate solids and the transport of formation fines from the subterranean zone upon producing fluids from the zone.

A method of fracturing a subterranean zone is also provided by the present invention comprised of the following steps. A fracturing fluid having proppant particles suspended therein is provided. Reticulated foam fragments are combined with the fracturing fluid to thereby form a mixture of the reticulated foam fragments with the proppant particles suspended in the fracturing fluid. The reticulated foam fragments are present in the fracturing fluid in an amount in the range of from about 0.1% to about 5% by weight of the proppant particles therein. The fracturing fluid is introduced into the subterranean zone at a rate and pressure sufficient to extend fractures in the subterranean zone. Thereafter, the mixture of the reticulated foam fragments and proppant particles is deposited in the subterranean zone whereby the reticulated foam fragments reduce or prevent the flow-back of the proppant particles and the transport of formation fines from the subterranean zone upon producing fluids from the zone.

The objects, features and advantages of the present invention will be readily apparent to those skilled in the art upon a reading of the description of preferred embodiments which follows when taken in view of the accompanying drawings.

DESCRIPTION OF PREFERRED EMBODIMENTS

Figure 1:
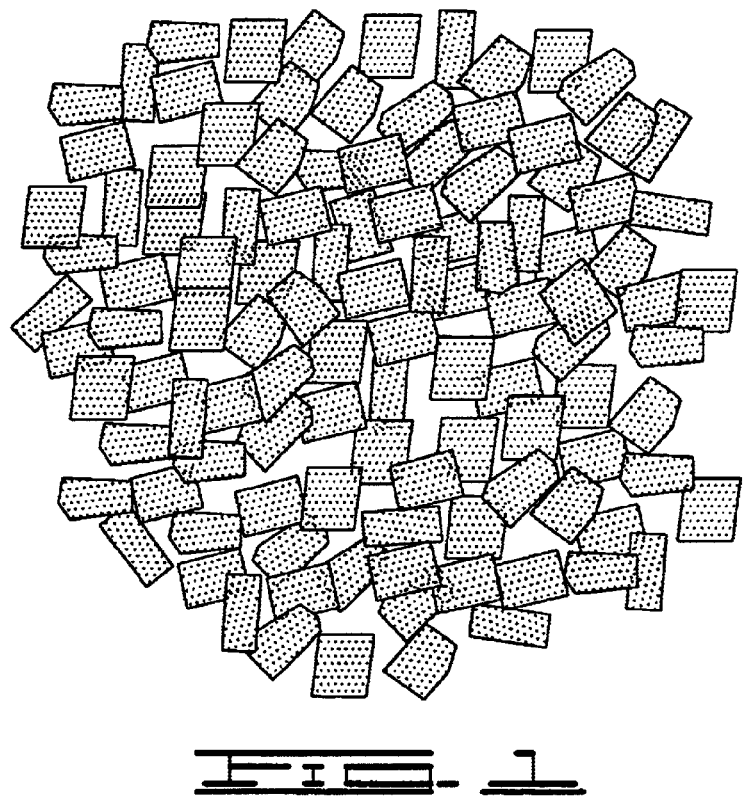
FIG. 1 is a photograph of reticulated foam fragments useful in accordance with this invention.

The present invention provides methods of reducing or preventing the flow-back of particulate solids placed in subterranean zones as well as the transport of formation fines from the subterranean zones upon producing fluids therefrom. A method of this invention for treating a subterranean zone is comprised of the following steps. A treating fluid having a mixture of reticulated foam fragments and particulate solids suspended therein is provided. The treating fluid is introduced into the subterranean zone and the mixture of reticulated foam fragments and particulate solids is deposited in the subterranean zone. The reticulated foam fragments reduce or prevent the flow-back of the particulate solids and the transport of formation fines from the subterranean zone upon producing fluids from the zone.

The reticulated foam fragments useful in accordance with this invention can be formed of various materials including, but not limited to, resins, polyolefins, polyurethanes, polyvinylchlorides, metals and ceramics. The reticulated foam fragments preferably have a pore density in the range of from about 5 to about 80 pores per linear inch and can have various shapes. Preferably, the fragments have lengths no longer than about 1 inch and widths or diameters no longer than about ½ inch. Particularly suitable reticulated foam fragments are cubical and have lengths of about ½ inch, widths of about ¼ inch and thicknesses of about ⅛ inch.

Generally, the reticulated foam fragments are present in the treating fluid in an amount in the range of from about 0.1% to about 5% by weight of the particulate solids therein, more preferably in an amount of about 0.25% to about 1.5% and most preferably in an amount of about 1%.

Various treating fluids can be utilized in accordance with this invention including, but not limited to, aqueous fluids, liquid hydrocarbon fluids and foamed aqueous and liquid hydrocarbon fluids. Of these, an aqueous treating fluid is generally preferred. The viscosity of the treating fluid utilized can be increased by combining a gelling agent therewith in order to suspend the mixture of reticulated foam fragments and particulate solids therein. A variety of gelling agents well known to those skilled in the art can be utilized, including, but not limited to, natural and derivatized polysaccharides which are soluble, dispersible or swellable in aqueous liquids and biopolymers such as xanthan and succinoglycon. Of the various gelling agents which can be utilized, modified gums such as carboxyalkyl derivatives like carboxymethylguar and hydroxyalkyl derivatives like hydroxypropylguar. Modified celluloses and derivatives thereof can also be employed including, but not limited to, carboxyethylcellulose, carboxymethylhydroxyethylcellulose, hydroxyethylcellulose, hydroxypropylcellulose and the like.

The particulate solids which can be utilized in the treating fluids include, but are not limited to, graded sand, ceramic materials, bauxite materials, glass materials, polymeric materials and wall nut hull material. Of these, graded sand is generally preferred. The particulate solids are generally included in the treating fluid in an amount in the range of from about 0.1 to about 30 pounds of particulate solids per gallon of the treating fluid.

In order to consolidate and strengthen the mixture of the reticulated foam fragments and particulate solids after the mixture has been deposited in the subterranean zone, the particulate solid can be coated with a hardenable resin composition. The hardenable resin composition hardens after the mixture of reticulated foam fragments and particulate solids has been placed in the subterranean zone and consolidates the mixture into a hard permeable mass. A particularly suitable hardenable resin composition which can be utilized is comprised of a hardenable resin component and a hardening agent component. Hardenable resin components which can be utilized include, but are not limited to, bisphenol A-epichlorohydrin resin, polyepoxide resin, novolac resin, polyester resin, phenol-aldehyde resin, urea-aldehyde resin, furan resin, urethane resin, glycidyl ether and mixtures thereof. The hardening agent component which delayedly causes the hardenable resin component to harden can include, but is not limited to, amines, aromatic amines, polyamines, aliphatic amines, cyclo-aliphatic amines, amides, polyamides, 4,4'-diaminodiphenyl sulfone, 2-ethyl-4-methyl imidazole and 1,1,3-trichlorotrifluoroacetone. Of these, 4,4'-diaminodiphenyl sulfone is generally preferred.

Most preferably, the reticulated foam fragments and the particulate solids in the treating fluid are coated with a tackifying agent. The presence of the tackifying agent prevents the segregation of the reticulated foam fragments from the particulate solids during mixing. In addition, after the mixture of reticulated foam fragments and particulate solids is deposited in the subterranean zone, the tackifying agent causes the reticulated foam fragments and particulate solids to stick together and formation fines produced from the subterranean zone to stick to the reticulated foam fragments and particulate solids. Tackifying compounds which can be utilized include, but are not limited to, liquids and solutions of polyamides, polyesters, polycarbonates, polycarbamates, natural resins and the reaction product of a polyacid with a multivalent ion. Of these, the reaction product of a polyacid with a multivalent ion is preferred. Tackifying compounds of the types set forth above are described in detail in U.S. Pat. No. 5,833,000 issued to Weaver et al. on Nov. 10, 1998 which is incorporated herein by reference thereto.

Another method of this invention for fracturing a subterranean zone is comprised of the following steps. A fracturing fluid having proppant particles suspended therein is provided. Reticulated foam fragments are combined with the fracturing fluid to thereby form a mixture of the reticulated foam fragments with the proppant particles suspended therein. The fracturing fluid is introduced into the subterranean zone at a rate and pressure sufficient to extend fractures in the subterranean zone. Thereafter, the mixture of the reticulated foam fragments and the proppant particles is deposited in the subterranean zone whereby the reticulated foam fragments reduce or prevent the flow-back of the proppant particles and the transport of formation fines from the subterranean zone upon producing fluids from the zone.

The reticulated foam fragments and the proppant particles are the same as those described above as are the other components, amounts and the like set forth above.

A preferred method of treating a subterranean zone of this invention comprises the steps of: (a) providing a treating fluid having a mixture of reticulated foam fragments and particulate solids suspended therein; (b) introducing the treating fluid into the subterranean zone; and (c) depositing the mixture of the reticulated foam fragments and the particulate solids in the subterranean zone whereby the reticulated foam fragments reduce or prevent the flow-back of the particulate solids and the transport of formation fines from the subterranean zone upon producing fluids from the zone.

Another preferred method of fracturing a subterranean zone of this invention comprises the steps of: (a) providing a fracturing fluid having proppant particles suspended therein; (b) combining reticulated foam fragments with the fracturing fluid to thereby form a mixture of the reticulated foam fragments and the proppant particles suspended therein; (c) introducing the fracturing fluid into the subterranean zone at a rate and pressure sufficient to extend fractures in the subterranean zone; and (d) depositing the mixture of the reticulated foam fragments and the proppant particles in the subterranean zone whereby the reticulated foam fragments reduce or prevent the flow-back of the proppant particles and the transport of formation fines from the subterranean zone upon producing fluids from the zone.

In order to further illustrate the methods of this invention, the following examples are given.

EXAMPLE 1

Without Tackifying Agent

An amount of 300 grams of bauxite proppant was used to form a slurry with water prior to adding 3 grams of reticulated foam particulate having a pore density of 30 pores per linear inch (ppi) and dimensions of ⅜ inch in length, ¼ inch in width and ⅛ inch in thickness. The reticulated foam particulate used is shown in FIG. 1. Stirring was continued until a homogeneous slurry was formed. The mixture was then packed into a visual flow chamber. A ½ inch perforation was installed at the outlet of the chamber. The inlet of the flow chamber was connected to tap water faucets. Flow was established once the flow chamber was filled with water. A slow flow rate (250 mL/min) was initiated and steadily increased until the faucets were fully opened whereby the flow rate was greater than 16 L/min. Only a very small amount of proppant was produced during the initial flow and no additional proppant was produced afterward, even as the flow was cycled from 0 to more than 16 L/min.

EXAMPLE 2

With Tackifying Agent

Figure 2:
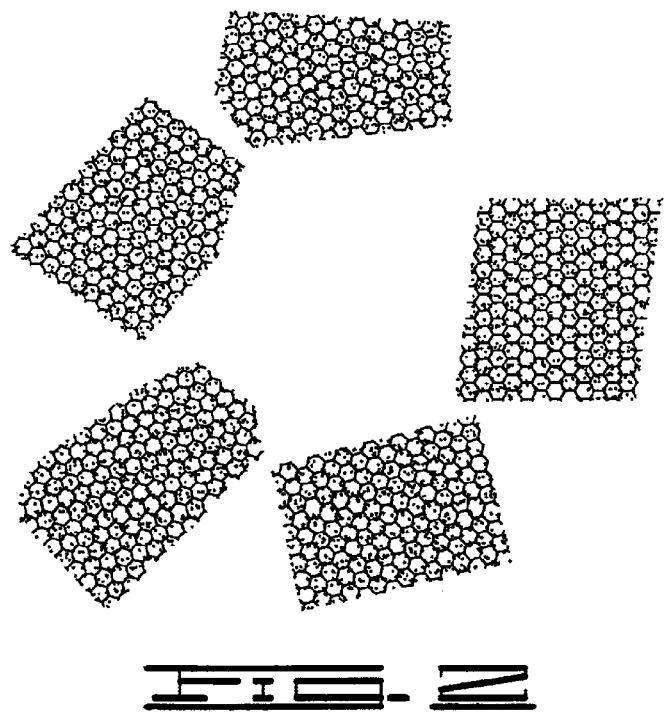
FIG. 2 is a photograph of the reticulated foam fragments of FIG. 1 having proppant entrapped therein.

A proppant slurry was prepared as described in Example 1 except that a polyamide-type tackifying agent in the amount of 4.5 mL was first dry coated onto the proppant before mixing the proppant with water to form the slurry. Three grams of 30 ppi reticulated foam particulate was added to the slurry as the slurry was being stirred. The mixture of proppant and reticulated foam was then packed into the flow chamber and was subjected to a flow test as described above. During the flow test the proppant pack remained stable during increasing and cycling flow rates of from 0 to 16 L/min. Only a very small amount of proppant was produced as the initial flow was established. It was also observed that the proppant grains were embedded and entrapped within the reticulated foam fragments, forming small, stable individual proppant "pillows" within the proppant pack as shown in FIG. 2.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of treating a subterranean zone comprising the steps of:
   (a) providing a treating fluid having a mixture of reticulated foam fragments and particulate solids suspended therein;
   (b) introducing said treating fluid into said subterranean zone; and
   (c) depositing said mixture of said reticulated foam fragments and said particulate solids in said subterranean zone whereby said reticulated foam fragments reduce or prevent the flow-back of said particulate solids and the transport of formation fines from said subterranean zone upon producing fluids from said zone.

2. The method of claim 1 wherein said reticulated foam fragments have a pore density in the range of from about 5 to about 80 pores per linear inch.

3. The method of claim 1 wherein said reticulated foam fragments are of various shapes that have lengths no longer than about 1 inch and widths or diameters no longer than about ½ inch.

4. The method of claim 1 wherein said reticulated foam fragments are cubical and have a length of about ½ inch, a width of about ¼ inch and a thickness of about ⅛ inch.

5. The method of claim 1 wherein said reticulated foam fragments are formed of resins, polyolefins, polyurethanes, polyvinylchlorides, metals and ceramics.

6. The method of claim 1 wherein said reticulated foam fragments are present in said treating fluid in an amount in the range of from about 0.1% to about 5% by weight of said particulate solids therein.

7. The method of claim 1 wherein said treating fluid is an aqueous fluid.

8. The method of claim 1 wherein said particulate solids suspended in said treating fluid are selected from the group consisting of sand, ceramic materials, bauxite materials, glass materials, polymeric materials and wall nut hull material.

9. The method of claim 1 wherein said particulate solids suspended in said treating fluid are coated with a hardenable resin composition which hardens and consolidates said mixture of reticulated foam fragments and said particulate solids into a hard permeable mass after they have been deposited in said subterranean zone in accordance with step (c).

10. The method of claim 9 wherein said hardenable resin composition is comprised of a hardenable resin component and a hardening agent component.

11. The method of claim 10 wherein said hardenable resin component is comprised of at least one member selected from the group consisting of bisphenol A-epichlorohydrin resin, polyepoxide resin, novolak resin, polyester resin, phenol-aldehyde resin, urea-aldehyde resin, furan resin, urethane resin, glycidyl ether and mixtures thereof.

12. The method of claim 10 wherein said hardening agent component is comprised of at least one member selected from the group consisting of amines, aromatic amines, polyamines, aliphatic amines, cyclo-aliphatic amines, amides, polyamides, 4,4'-diaminodiphenyl sulfone, 2-ethyl-4-methyl imidazole and 1,1,3-trichlorotrifluoroacetone.

13. The method of claim 1 wherein said particulate solids suspended in said treating fluid are coated with a tackifying compound which causes said reticulated foam fragments and said particulate solids to stick together and formation fines to stick to said reticulated foam fragments and said particulate solids.

14. The method of claim 13 wherein said tackifying compound is comprised of at least one member selected from the group consisting of liquids and solutions of polyamides, polyesters, polycarbonates, polycarbamates, natural resins and the reaction product of a polyacid with a multivalent ion.

15. A method of fracturing a subterranean zone comprising the steps of:
   (a) providing a fracturing fluid having proppant particles suspended therein;
   (b) combining reticulated foam fragments with said fracturing fluid to thereby form a mixture of said reticulated foam fragments with said proppant particles suspended therein;
   (c) introducing said fracturing fluid into said subterranean zone at a rate and pressure sufficient to extend fractures in said subterranean zone; and
   (d) depositing said mixture of said reticulated foam fragments and said proppant particles in said subterranean zone whereby said reticulated foam fragments reduce or prevent the flow-back of said proppant particles and the transport of formation fines from said subterranean zone upon producing fluids from said zone.

16. The method of claim 15 wherein said reticulated foam fragments have a pore density in the range of from about 5 to about 80 pores per linear inch.

17. The method of claim 15 wherein said reticulated foam fragments are of various shapes that have lengths no longer than about 1 inch and widths or diameters no longer than about ½ inch.

18. The method of claim 15 wherein said reticulated foam fragments are cubical and have a length of about ½ inch, a width of about ¼ inch and a thickness of about ⅛ inch.

19. The method of claim 15 wherein said reticulated foam fragments are formed of resins, polyolefins, polyurethanes, polyvinylchlorides, metals and ceramics.

20. The method of claim 15 wherein said reticulated foam fragments are present in said treating fluid in an amount in the range of from about 0.1% to about 5% by weight of said particulate solids therein.

21. The method of claim 15 wherein said fracturing fluid is an aqueous treating fluid.

22. The method of claim 15 wherein said proppant particles suspended in said fracturing fluid are selected from the group consisting of sand, ceramic materials, bauxite materials, glass materials, polymeric materials and wall nut hull material.

23. The method of claim 15 wherein said proppant particles suspended in said fracturing fluid are coated with a hardenable resin composition which hardens and consolidates said mixture of reticulated foam fragments and said particulate solids into a hard permeable mass after they have been deposited in said subterranean zone in accordance with step (d).

24. The method of claim 23 wherein said hardenable resin composition is comprised of a hardenable resin component and a hardening agent component.

25. The method of claim 24 wherein said hardenable resin component is comprised of at least one member selected from the group consisting of bisphenol A-epichlorohydrin resin, polyepoxide resin, novolak resin, polyester resin, phenol-aldehyde resin, urea-aldehyde resin, furan resin, urethane resin, glycidyl ether and mixtures thereof.

26. The method of claim 24 wherein said hardening agent component is comprised of at least one member selected from the group consisting of amines, aromatic amines, polyamines, aliphatic amines, cyclo-aliphatic amines, amides, polyamides, 4,4'-diaminodiphenyl sulfone, 2-ethyl-4-methyl imidazole and 1,1,3-trichlorotrifluoroacetone.

27. The method of claim 15 wherein said proppant particles suspended in said treating fluid are coated with a tackifying compound which causes said reticulated foam fragments and said particulate solids to stick together and formation fines to stick to said reticulated foam fragments and said particulate solids.

28. The method of claim 15 wherein said tackifying compound is comprised of at least one member selected from the group consisting of liquids and solutions of polyamides, polyesters, polycarbonates, polycarbamates, natural resins and the reaction product of a polyacid with a multivalent ion.

* * * * *